(12) United States Patent
Scholz et al.

(10) Patent No.: US 9,708,458 B2
(45) Date of Patent: *Jul. 18, 2017

(54) SILICONE RUBBER

(75) Inventors: Mario Scholz, Gründau (DE); Jürgen Meyer, Stockstadt (DE)

(73) Assignee: EVONIK DEGUSSA GMBH, Essen (DE)

(*) Notice: Subject to any disclaimer, the term of this patent is extended or adjusted under 35 U.S.C. 154(b) by 1555 days.

This patent is subject to a terminal disclaimer.

(21) Appl. No.: 10/591,610

(22) PCT Filed: Feb. 8, 2005

(86) PCT No.: PCT/EP2005/001228
§ 371 (c)(1),
(2), (4) Date: Sep. 5, 2006

(87) PCT Pub. No.: WO2005/095503
PCT Pub. Date: Oct. 13, 2005

(65) Prior Publication Data
US 2007/0173587 A1   Jul. 26, 2007

(30) Foreign Application Priority Data
Mar. 5, 2004 (DE) .................. 10 2004 010 755

(51) Int. Cl.
C08K 3/36 (2006.01)

(52) U.S. Cl.
CPC ..................... C08K 3/36 (2013.01)

(58) Field of Classification Search
CPC .................. C08K 3/36; C08L 83/04
USPC .................................. 524/492, 493
See application file for complete search history.

(56) References Cited

U.S. PATENT DOCUMENTS

| | | | | |
|---|---|---|---|---|
| 5,959,005 A | * | 9/1999 | Hartmann et al. | 523/213 |
| 5,976,480 A | * | 11/1999 | Mangold et al. | 423/336 |
| 6,193,795 B1 | * | 2/2001 | Nargiello et al. | 106/484 |
| 6,331,588 B1 | * | 12/2001 | Azechi et al. | 524/493 |
| 6,384,125 B1 | * | 5/2002 | Bergstrom et al. | 524/492 |
| 6,846,865 B2 | | 1/2005 | Panz et al. | |
| 6,899,951 B2 | | 5/2005 | Panz et al. | |
| 6,956,080 B2 | | 10/2005 | Scholz et al. | |
| 7,022,375 B2 | | 4/2006 | Schachtely et al. | |
| 7,563,839 B2 | * | 7/2009 | Scholz et al. | 524/424 |
| 7,713,626 B2 | * | 5/2010 | Meyer et al. | 428/404 |
| 2002/0044903 A1 | * | 4/2002 | Oswald et al. | 423/335 |
| 2002/0077412 A1 | * | 6/2002 | Kobayashi et al. | 524/588 |
| 2002/0168524 A1 | | 11/2002 | Kerner et al. | |
| 2003/0130379 A1 | | 7/2003 | Panz et al. | |
| 2003/0195290 A1 | * | 10/2003 | Scholz et al. | 524/493 |
| 2005/0171268 A1 | * | 8/2005 | Scholz et al. | 524/492 |
| 2007/0191537 A1 | * | 8/2007 | Meyer et al. | 524/588 |

FOREIGN PATENT DOCUMENTS

| | | |
|---|---|---|
| DE | 43 23 229 A1 | 1/1995 |
| EP | 0 691 365 A | 1/1996 |
| EP | 0 900 829 A | 3/1999 |
| EP | 1 085 053 A | 3/2001 |
| EP | 1 182 168 A | 2/2002 |
| WO | WO 03/040048 A | 5/2003 |
| WO | WO 2004/033544 A | 4/2004 |

* cited by examiner

*Primary Examiner* — Michael A Salvitti
(74) *Attorney, Agent, or Firm* — Smith, Gambrell & Russell, LLP

(57) ABSTRACT

Silicone rubber containing structurally modified hydrophobic pyrogenic silica.

6 Claims, No Drawings

SILICONE RUBBER

The invention concerns silicone rubber, a process for its production and its use.

The use of hydrophobed pyrogenic silica as a filler in silicone rubber is known (DE 199 43 666 A1).

U.S. Pat. No. 6,331,588 describes liquid silicone rubber (LSR), which contains pyrogenic silicas as fillers. In order to prevent the undesirable influence of the silanol groups on the mechanical properties of the silicone rubber, it is necessary according to U.S. Pat. No. 6,331,588 to render the surface of the pyrogenic silica hydrophobic.

According to the prior art, in the case of LSR (liquid silicone rubber), either a hydrophilic silica is hydrophobed in situ and at the same time exposed to very high shear forces, so that the viscosity and the yield point can be lowered, or a pre-hydrophobed silica is exposed to high shear forces for the same reason.

The invention provides a silicone rubber which is characterised in that it contains a structurally modified hydrophobic pyrogenic silica as filler.

In a preferred embodiment of the invention, a silanised, structurally modified silica, characterised by vinyl groups fixed to the surface, hydrophobic groups such as trimethyl silyl and/or dimethyl silyl and/or monomethyl silyl groups additionally being fixed to the surface, and having the following physico-chemical properties:
BET surface area $m^2/g$: 25-400
Average primary particle size nm: 5-50
pH: 3-10
Carbon content %: 0.1-10
DBP value %: <200 or not determinable can be used as silica.

The silanised, structurally modified silica can be produced by treating silica with a surface-modifying agent, heat treating and then structurally modifying the mixture obtained.

Here the silicas can be sprayed first with water and then with the surface-modifying agent, optionally mixed further, then heat treated and then structurally modified.

The surface modification can be performed by spraying the silicas first optionally with water and then with the surface-modifying agent. The water used can be acidulated with an acid, for example hydrochloric acid, to obtain a pH of 7 to 1. If several surface-modifying agents are used, they can be applied together, but separately, one at a time or as a mixture. The surface-modifying agent(s) can be dissolved in suitable solvents. Once spraying has been completed, mixing can be continued for a further 5 to 30 min.

The mixture is then heat treated at a temperature of 20 to 400° C. for a period of 0.1 to 6 h. The heat treatment can take place under protective gas, such as nitrogen for example.

The process for producing the silanised, structurally modified silica according to the invention can alternatively be performed by treating the silica with the surface-modifying agent in vapour form, heat treating and then structurally modifying the mixture obtained.

The alternative method of surface modification of the silicas can be performed by treating the silicas with the surface-modifying agent in vapour form and then heat treating the mixture at a temperature of 50 to 800° C. for a period of 0.1 to 6 hours. The heat treatment can take place under protective gas, such as nitrogen for example.

The heat treatment can also take place in several stages at different temperatures.

The surface-modifying agent(s) can be applied with one-fluid, two-fluid or ultrasonic nozzles.

The surface modification can be performed in heatable mixers and dryers with sprayers, continuously or in batches. Suitable devices can be ploughshare mixers, plate dryers, fluidised-bed or flash dryers, for example.

The structural modification of the silicas produced in this way can then be performed by mechanical action. The structural modification can possibly be followed by post-grinding. Further conditioning can optionally be performed after the structural modification and/or post-grinding.

The structural modification can be performed with a ball mill or a continuous ball mill, for example.

The post-grinding can be performed with an air-jet mill, toothed disc mill or pinned disc mill, for example.

The conditioning or heat treatment can be performed batchwise, in a drying oven for example, or continuously, in a fluidised bed for example. The conditioning can take place under protective gas, e.g. nitrogen.

A pyrogenically produced silica, preferably a silica produced pyrogenically by flame hydrolysis of $SiCl_4$, can be used as the silica. Such pyrogenic silicas are known from Ullmanns Enzyklopädie der technischen Chemie, $4^{th}$ Edition, Volume 21, page 464 (1982).

The following can be used as silicas, for example:

TABLE 1

| | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| CAS reg. number | 112945-52-5 (old no.: 7631-86-9) | | | | | | | |
| Reaction to water | hydrophilic | | | | | | | |
| Appearance | loose white powder | | | | | | | |
| BET[1] surface area $m^2/g$ | 200 ± 50 | 90 ± 15 | 130 ± 25 | 150 ± 15 | 200 ± 25 | 300 ± 30 | 380 ± 30 | 50 ± 15 |
| Average primary particle size mm | 40 | 20 | 16 | 14 | 12 | 7 | 7 | 40 |
| Compacted bulk density[2] normal product g/l | approx. 60 | approx. 80 | approx. 50 | approx. | approx. | approx. | approx. | approx. 130 |
| compacted product g/l (additive "V") | — | — | approx. 120 | approx. 120 | approx. 120 | approx. 120 | approx. 120 | — |
| Loss on drying[3] (2 h at 105° C.) % on leaving the supplier | <2.5 | <1.0 | <1.5 | <0.5[9] | <1.5 | <1.5 | <2.0 | >1.5 |
| Loss on ignition[4][7] (2 h at 1000° C.) % | <2.5 | <1 | <1 | <1 | <1 | <2 | <2.5 | <1 |
| pH[5] (in 4% aqueous dispersion) | 3.6–4.5 | 3.7–4.7 | 3.7–4.7 | 3.7–4.7 | 3.7–4.7 | 3.7–4.7 | 3.7–4.7 | 3.6–4.3 |
| $SiO_2$[8] % | >99.8 | >99.8 | >99.8 | >99.8 | >99.8 | >99.8 | >99.8 | >99.8 |
| $Al_2O_3$[8] % | <0.05 | <0.05 | <0.05 | <0.05 | <0.05 | <0.05 | <0.05 | <0.08 |
| $Fe_2O_3$[8] % | <0.003 | <0.003 | <0.003 | <0.003 | <0.003 | <0.003 | <0.003 | <0.01 |

TABLE 1-continued

| | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| $TiO_2$[8] % | <0.03 | <0.03 | <0.03 | <0.03 | <0.03 | <0.03 | <0.03 | <0.03 |
| $HCl$[8)10] % | <0.025 | <0.025 | <0.025 | <0.025 | <0.025 | <0.025 | <0.025 | <0.025 |
| Screen oversize[6] (according to Mocker, 45 μm) % | <0.05 | <0.05 | <0.05 | <0.05 | <0.05 | <0.05 | <0.05 | 0.2 |

[1] by reference to DIN 66131
[2] by reference to DIN ISO 787/XI, JIS K 5101/18 (not screened)
[3] by reference to DIN ISO 787/II, ASTM D 280, JIS K 5101/21
[4] by reference to DIN 55921, ASTM D 1208, JIS K 5101/23
[5] by reference to DIN ISO 787/IX, ASTM D 1208, JIS K 5101/24
[6] by reference to DIN ISO 787/XVIII, JIS K 5101/20
[7] based on the substance dried for 2 hours at 105° C.
[8] based on the substance annealed for 2 hours at 1000° C.
[9] special moisture-excluding packaging
[10] HCl content in ignition loss component All compounds that are suitable for fixing vinyl or vinyl silyl and trimethyl silyl and/or dimethyl silyl and/or monomethyl silyl groups to the silica surface can be used as surface-modifying agents. By preference here, vinyl silyl and methyl silyl groups can be applied to the silica by means of one compound, such as e.g. 1,3-divinyl-1,1,3,3-tetramethyl disilazane or dimethyl vinyl silanol, or by means of multiple compounds, such as e.g. vinyl triethoxysilane and hexamethyl disilazane or trimethyl silanol.

If this low-structured, pyrogenic silicon dioxide is incorporated into silicone rubber, entirely novel properties are obtained in the silicone rubber.

The structural modification changes the morphology of the pyrogenic silicon dioxide such that a lower degree of intergrowth and hence a lower structure are obtained.

In a preferred embodiment of the invention, the silicone rubber can be a liquid silicone rubber (LSR).

Polydimethyl siloxanes having molecular weights of between 400,000 and 600,000, which are produced by addition of regulators such as hexamethyl or divinyl tetramethyl disiloxane and carry corresponding end groups, are used for elastomer applications. In order to improve the vulcanisation behaviour and also the tear propagation resistance, small amounts (<1%) of vinyl groups can be incorporated into the main chain as substituents by adding vinyl methyl dichlorosilane to the reaction mixture (VMQ).

The molecular structure of liquid silicone rubber (LSR) is almost identical to that of HTV, except that the average molecular chain length is shorter by a factor of 6 and hence the viscosity is lower by a factor of 1000 (20-40 Pas). The processor is supplied with two components (A and B) in equal quantities, which already contain the fillers, vulcanising agents and optionally other additives.

Silicone rubber can denote both organopolysiloxanes and hydrogen siloxanes.

The term organopolysiloxanes within the meaning of the invention includes all polysiloxanes used until now in cross-linkable organopolysiloxane compounds. It is preferably a siloxane consisting of units having the general formula (I)

$$(R^1)_a(R^2)_b SiO_{(4-a-b)/2} \quad (I)$$

in which
$R^1$ denotes a monovalent aliphatic radical having 1 to 8 carbon atoms and
$R^2$ denotes an alkenyl radical having 2 to 8 carbon atoms,
a=0, 1, 2 or 3
b=0, 1 or 2
and the sum a+b=0, 1 or 2 or 3,
with the proviso that on average there are at least two $R^2$ radicals per molecule. (a) is preferably dimethyl vinyl siloxy-terminated.

In a preferred embodiment of the invention, the organopolysiloxanes according to the invention display viscosities of 0.01 to 200 Pas, most particularly preferably 0.2 to 200 Pas.

The viscosities are determined in accordance with DIN 53019 at 20° C. Depending on the production process, in the case of branched polymers in particular, which can also be solid resins dissolved in solvents, up to a maximum of 10 mol % of all Si atoms can also display alkoxy or OH groups.

Hydrogen siloxanes within the meaning of the invention are preferably linear, cyclic or branched organopolysiloxanes consisting of units having the general formula (II)

$$(R^1)_c(H)_d SiO_{(4-c-d)/2} \quad (II)$$

in which
$R^1$ is a monovalent aliphatic radical having 1 to 8 carbon atoms,
c=0, 1, 2 or 3,
d=0, 1 or 2,
wherein the sum c+d=0, 1, 2 or 3,
with the proviso that on average there are at least two Si-bound hydrogen atoms per molecule.

There are two types of filler: reinforcing and non-reinforcing fillers.

Non-reinforcing fillers are characterised by extremely weak interactions with the silicone polymer. They include chalk, silica flour, diatomaceous earth, mica, kaolin, $Al(OH)_3$ and $Fe_2O_3$. The particle diameter is of the order of 0.1 μm. They are used to raise the viscosity of the compounds in the unvulcanised state and to increase the Shore hardness and the modulus of elasticity of the vulcanised rubbers. Improvements in tear strength can also be achieved in the case of surface-treated fillers.

Reinforcing fillers are primarily fine-particle silicas having a surface area of >125 m²/g. The reinforcing effect can be attributed to the bond between the filler and the silicone polymer. Such bonds are formed between the silanol groups at the surface of the silicas (3-4.5 SiOH groups/nm²) and the silanol groups in the a-ω-dihydroxypolydimethyl siloxanes by means of hydrogen bridge bonds to the oxygen in the siloxane chain. These filler-polymer interactions result in increased viscosity and changes to the glass transition temperature and the crystallisation behaviour. On the other hand, polymer-filler bonds improve the mechanical properties but can also lead to premature stiffening (crepe hardening) of the rubbers.

Talc occupies an intermediate position between reinforcing and non-reinforcing fillers. Fillers are also used for special effects. They include iron oxide, titanium dioxide, zirconium oxide or barium zirconate to increase thermal stability.

Silicone rubbers can also contain catalysts, crosslinking agents, coloured pigments, anti-sticking agents, plasticisers and coupling agents as additional components.

Plasticisers are needed in particular to establish a low modulus of elasticity. Internal coupling agents are based on functional silanes, which can interact firstly with the substrate and secondly with the crosslinking silicone polymer (used primarily in RTV-1 rubbers).

Low-molecular-weight or monomeric silanol-rich compounds (for example diphenyl silanediol, $H_2O$) counteract premature stiffening. They forestall too strong an interaction of the silicone polymers with the silanol groups in the filler by reacting more quickly with the filler. A corresponding effect can also be achieved by partially coating the filler with trimethyl silyl groups (filler treatment with methyl silanes).

The siloxane polymer can also be chemically modified (phenyl polymers, boron-containing polymers) or blended with organic polymers (butadiene-styrene copolymers).

The low viscosity of the starting polymer requires particularly intensive incorporation and kneading in specially developed mixing units in order to achieve a homogeneous distribution. To facilitate filler absorption and to prevent crepe hardening, the silica is rendered fully hydrophobic—usually in situ during the mixing process using hexamethyl disilazane (HMDS).

The vulcanisation of LSR blends is performed by hydrosilylation, i.e. by addition of methyl hydrogen siloxanes (having at least 3 SiH groups in the molecule) to the vinyl group in the polymer with catalysis by ppm amounts of Pt(O) complexes, the crosslinking agent and catalyst being contained in the separate components on delivery. Special inhibitors, for example 1-ethynyl-1-cyclohexanol, prevent premature vulcanisation on mixing of the components and establish a dropping time of approximately 3 days at room temperature. The proportions can be adjusted within a considerable bandwidth by means of the platinum and inhibitor concentration.

LSR blends are increasingly being used to produce electrically conductive silicone rubber products, because the addition crosslinking is not disrupted by furnace blacks as is the case with the peroxide vulcanisation conventionally used with HTV (acetylene black is preferably used in HTV blends). Conductive furnace blacks are also easier to incorporate and to distribute than graphite or metal powders, of which silver is preferred.

The silicone rubber according to the invention displays the following advantages:

Experiments in LSR (liquid silicone rubber) show that the structurally modified hydrophobic oxides in accordance with Examples 1 to 3 according to the invention display markedly lower viscosities in the liquid silicone in comparison to the hydrophobic educt (pyrogenic silica).

The silicas according to the invention display no yield points, which is particularly advantageous because very good flow characteristics are desirable when processing liquid silicone rubber.

Furthermore, Example 3 also displays the advantage that a markedly higher tear propagation resistance can be achieved with the structurally modified, vinyl silane-treated silicas.

With the structurally modified oxides, materials can be used according to the invention which because of their low structure already display extremely low viscosities and no yield points and which therefore do not have to be exposed to high shear forces during production. The saving of energy, time and material costs, combined with the production of vulcanisates having superior mechanical properties, is advantageous to the user.

EXAMPLES

Pyrogenic silica is placed in a mixer and sprayed first with water and then with the surface-modifying agent or the blend of surface-modifying agents. The reaction mixture then undergoes a single-stage or multi-stage heat treatment. The conditioned material is structurally modified with a ball mill, followed if necessary by post-grinding with a toothed disc mill. The structurally modified or structurally modified and post-ground material undergoes a further heat treatment if necessary.

TABLE 2

Overview of the production of the silicas for use according to the invention (examples)

| Name | Silica used | Amount of water (parts/100 parts of silica) | SM*) (parts/100 parts of silica) | Heat treatment, stage 1 temp. [° C.]/ duration [h] | Heat treatment, stage 2 temp. [° C.] duration [h] | Post-grinding**) | Heat treatment***) temp. [° C.] duration [h] |
|---|---|---|---|---|---|---|---|
| Sil 1 | AEROSIL ® 200 | 5 | A/5 D/5 | 140/2 | — | no | no |
| Sil 2 | AEROSIL ® 300 | 5 | B/15 C/1.8 | 20/2 | 140/2 | yes | yes |
| Sil 3 | AEROSIL ® 300 | 5 | A/8.5 B/20 | 50/5 | 140/1 | yes | 120/2 |
| Sil 4 | AEROSIL ® 300 | 5 | A/16 B/12 | 20/6 | 120/5 | yes | 120/3 |
| Sil 5 | AEROSIL ® 150 | 5 | C/20 | 130/2 | — | yes | 120/2 |
| Sil 6 | AEROSIL ® 130 | 2 | C/5 D/5 | 150/3 | — | no | no |
| Sil 7 | AEROSIL ® 300 | 5 | A/8.5 B/20 | 50/5 | 140/1 | no | no |
| Sil 8 | AEROSIL ® 200 | 5 | B/10 C/5 | 20/20 | 140/3 | yes | no |

TABLE 2-continued

Overview of the production of the silicas for use according to the invention (examples)

| Name | Silica used | Amount of water (parts/100 parts of silica) | SM*) (parts/100 parts of silica) | Heat treatment, stage 1 temp. [° C.]/ duration [h] | Heat treatment, stage 2 temp. [° C.] duration [h] | Post-grinding**) | Heat treatment***) temp. [° C.] duration [h] |
|---|---|---|---|---|---|---|---|
| Sil 9 | AEROSIL® 300 | 5 | C/16 | 20/2 | 140/2 | yes | no |
| Sil 10 | AEROSIL® 200 | 2 | A/10 B/5 | 20/2 | 140/24 | yes | 120/2 |
| Sil 11 | AEROSIL® 300 | 5 | A/8.5 B/20 | 50/5 | 140/1 | yes | no |

*)SM = Surface-modifying agent:
A = vinyl triethoxysilane
B = hexamethyl disilazane
C = 1,3-divinyl-1,1,3,3-tetramethyl disilazane
D = methyl trimethoxysilane
With more than one SM, blends were used.
**)Post-grinding = grinding after structural modification
***)Heat treatment = heat treatment after post-grinding 2 kg of AEROSIL® are placed in a mixer and sprayed first with 0.1 kg of water and then with a mixture of 0.4 kg of hexamethyl disilazane and 0.17 kg of vinyl triethoxysilane, whilst being mixed. When spraying has been completed, mixing is continued for a further 15 minutes and the reaction mixture is conditioned first for 5 hours at 50° C. and then for 1 hour at 140° C.

TABLE 3

Physico-chemical data for the silicas for use according to the invention (examples) and the comparative silica

| Name | Compacted bulk density [g/l] | Loss on drying [%] | Loss on ignition [%] | pH | C content [%] | DBP adsorption [%] | Specific BET surface area [m²/g] |
|---|---|---|---|---|---|---|---|
| Comparative silica | 48 | 0.9 | 4.1 | 9.0 | 4.0 | n.d. | 197 |
| Sil 1 | 236 | 1.2 | 1.6 | 4.4 | 1.1 | 9.7 | 136 |
| Sil 2 | 147 | 0.7 | 3.8 | 6.2 | 3.8 | n.d. | 201 |
| Sil 3 | 120 | 0.4 | 3.6 | 7.5 | 4.0 | n.d. | 191 |
| Sil 4 | 132 | 0.5 | 3.0 | 5.2 | 3.5 | 128 | 189 |
| Sil 5 | 138 | 0.2 | 2.8 | 5.5 | 2.8 | n.d. | 103 |
| Sil 6 | 249 | 0.8 | 1.1 | 6.3 | 1.5 | 91 | 79 |
| Sil 7 | 266 | 1.1 | 3.4 | 8.5 | 4.0 | 121 | 204 |
| Sil 8 | 161 | 0.9 | 2.7 | 6.1 | 4.3 | 91 | 117 |
| Sil 9 | 132 | 1.0 | 4.0 | 6.7 | 4.9 | n.d. | 205 |
| Sil 10 | 149 | 0.6 | 2.8 | 5.1 | 2.8 | n.d. | 155 |
| Sil 11 | 163 | 0.8 | 3.5 | 8.5 | 4.0 | n.d. | 197 |

Testing of the Structurally Modified Pyrogenic Silicas in Silicone Rubber

The products from Table 2 are tested in an LSR silicone formulation. The hydrophobic educts that were used for the structural modification are used as comparative material.

LSR Silicone Rubber

20% silica is incorporated into organopolysiloxane (Silopren U 10 GE Bayer) in a high-speed planetary mixer at low speed (50/500 rpm planetary mixer/high-speed mixer).

As soon as the silica is completely wetted, a vacuum of approx. 200 mbar is applied and the mixture is dispersed for 30 minutes at a speed of 100 rpm (planetary mixer) and 2000 rpm (high-speed mixer) (cooled with tap water). After cooling, the basic mixture can be crosslinked.

340 g of the basic mixture are weighed into a stainless steel beaker. 6.00 g inhibitor (2% pure ECH in silicone polymer U 1) and 0.67 g platinum catalyst solution and 4.19 g Silopren U 730 are weighed one at a time into the mixture and homogenised at a speed of n=500 rpm and degassed.

Vulcanisation of the Formulations

4×50 g or 2×100 g of the mixture are needed to vulcanise the 2 mm vulcanisates. The sheets are then pressed in a press for 10 minutes under a pressure of 100 bar and at a temperature of 120° C. 120 g of the mixture are needed to vulcanise the 6 mm vulcanisates. The sheets are pressed in a press for 12 minutes under a pressure of 100 bar and at a temperature of 120° C. The vulcanisates are then post-vulcanised in an oven for 4 hours at 200° C.

The structurally modified products (Examples 1-3) display markedly lower rheological properties (Table 5) in comparison to the hydrophobic educt. The viscosity is up to 60% lower than the original value for the educt.

TABLE 5

Rheological properties with 20% silica

| Silica | Yield point [Pa] | Viscosity [Pas] D = 10 s⁻¹ |
|---|---|---|
| Example 1 [Sil 7] | 0 | 54 |
| Example 2 [Sil 11] | 0 | 55 |
| Example 3 [Sil 3] | 0 | 51 |
| Educt (comparative silica) | 0 | 153 |

TABLE 6

| | Mechanical properties with 20% silica | | | |
|---|---|---|---|---|
| Silica | Tensile strength [N/mm$^2$] | Elongation at break [%] | Tear propagation resistance [N/mm] | Hardness [Shore A] |
| Example 1 | 4.0 | 300 | 3.2 | 41 |
| Example 2 | 4.1 | 290 | 3.4 | 41 |
| Example 3 | 5.5 | 350 | 23.7 | 41 |
| Educt | 5.0 | 300 | 4.0 | 45 |

It can be seen from Example 3 in Table 6 that through the structural modification of the vinyl-modified pyrogenic oxide, with subsequent post-grinding, a very high tear propagation resistance can be obtained in the silicone vulcanisate, the rheological properties of the compound being at a very low level (Table 5).

The invention claimed is:

1. A liquid silicone rubber having high tear resistance, containing, as reinforcing filler, silanized structurally modified pyrogenic silica, characterized by vinyl groups fixed to the silica and hydrophobic groups including methyl containing silyl groups also fixed to the silica and where the silica has a surface area, as measured by BET, between 10 and 1000 m·$^2$/g and a DBP value %<200 or not determinable, wherein the silicone rubber is a organopolysiloxane that consists of units having formula (I):

$$(R^1)_a(R^2)_b SiO_{(4-a-b)/2} \quad (I),$$

where $R^1$ denotes a monovalent aliphatic radical having 1 to 8 carbon atoms, and $R^2$ denotes an alkenyl radical having 2-8 carbon atoms, and a=0, 1, 2 or 3, b=0, 1, or 2 and the sum a+b=0, 1, 2 or 3, with the proviso that on the average there are at least two $R^2$ radicals per molecule (a) is preferably dimethyl vinyl siloxy terminated; or a hydrogen silane that consists of units having formula (II), $$(R^1)_c(H)_d SiO_{(4-c-d)/2} \quad (II),$$

where $R^1$ denotes a monovalent aliphatic radical having 1 to 8 carbon atoms, and c=0, 1, 2 or 3, d=0, 1 or 2, and the sum of c+d is 0, 1, 2, or 3, with the proviso that on the average there are at least two Si— bound hydrogen atoms; and the structural modification of the pyrogenic silica results from treatment of a hydrophobized educt with a ball mill or a continuous ball mill and reduces the polyorganosiloxane viscosity to 0.2 to 200 Pas measured in accordance with DIN 53019 at 20° C.

2. The silicone rubber according to claim 1, wherein the structurally modified hydrophobic pyrogenic silica filler has a surface area, as measured by BET, between 25 and 400 m·$^2$/g.

3. The silicone rubber according to claim 1, wherein the structurally modified hydrophobic pyrogenic silica has a compacted bulk density between 120 g/l and 266 g/l.

4. The silicone rubber according to claim 1, wherein the silanized structurally modified hydrophobic pyrogenic silica is present in an amount of about twenty percent by weight of the composition.

5. The silicone rubber according to claim 1, wherein the displayed viscosity is 51-55 Pas.

6. The liquid silicone rubber having high tear resistance according to claim 1, wherein the reinforcing filler is prepared by a) treating pyrogenically produced silicas having a BET surface area m$^2$/g between 103-400 with a surface-modifying agent(s) in either vapor or spray form, b) heat treating the surface agent-modified silica, c) structurally modifying the heat treated surface agent modified silica by mechanical action to form low structured, surface agent-modified pyrogenic silica, d) post-grinding and heat treating the structurally modified silica and e) recovering the ground, heat treated, silanized, structurally modified pyrogenic silica, having surfaces fixed thereto vinyl groups or vinyl silyl groups, and hydrophobic groups selected from trimethyl silyl, dimethyl silyl, monomethyl silyl or mixtures thereof.

* * * * *